(12) United States Patent
Kim et al.

(10) Patent No.: US 10,901,380 B2
(45) Date of Patent: Jan. 26, 2021

(54) APPARATUS AND METHOD FOR CONTROLLING OPERATION OF HOME APPLIANCE, HOME APPLIANCE AND METHOD FOR OPERATING OF HOME APPLIANCE

(71) Applicant: LG ELECTRONICS INC., Seoul (KR)

(72) Inventors: Hyeong Jin Kim, Incheon (KR); Pil Goo Kang, Seoul (KR); Hyung Joo Cheon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/544,811

(22) Filed: Aug. 19, 2019

(65) Prior Publication Data

US 2019/0369577 A1 Dec. 5, 2019

(30) Foreign Application Priority Data

Jun. 4, 2019 (KR) .................. 10-2019-0066105

(51) Int. Cl.
| | | |
|---|---|---|
| *G05B 15/02* | (2006.01) | |
| *H04L 12/12* | (2006.01) | |
| *H04L 12/28* | (2006.01) | |
| *G10L 15/00* | (2013.01) | |

(52) U.S. Cl.
CPC .............. *G05B 15/02* (2013.01); *G10L 15/00* (2013.01); *H04L 12/12* (2013.01); *H04L 12/2816* (2013.01); *G05B 2219/2642* (2013.01)

(58) Field of Classification Search
None
See application file for complete search history.

(56) References Cited

U.S. PATENT DOCUMENTS 10,455,271 B1 * 10/2019 Nye ................... H04N 21/4394
2004/0111496 A1 * 6/2004 Han ..................... H04L 61/2038
709/220

(Continued)

FOREIGN PATENT DOCUMENTS

| CA | 2891742 A1 * | 11/2015 | ............. G10L 15/30 |
|---|---|---|---|
| KR | 1020140037519 | 3/2014 | |
| KR | 1020190042919 | 4/2019 | |

*Primary Examiner* — Jennifer L Norton
(74) *Attorney, Agent, or Firm* — Lee, Hong, Degerman, Kang & Waimey PC

(57) ABSTRACT

Disclosed is an apparatus and method for controlling operation of at least one home appliance by executing artificial intelligence (AI) algorithms and/or machine learning algorithms in a connected 5G environment for the Internet of things (IoT). The home appliance control apparatus according to an embodiment of the present disclosure includes a setting unit for setting one home appliance among a plurality of home appliances as a main home appliance and for setting at least one of the remaining home appliances as a sub-home appliance when a voice command is received from an utterer, and a communication control unit for controlling the main home appliance and the sub-home appliance to communicate with each other using a mutually agreed communication protocol other than a pre-set network communication when a predetermined condition is satisfied.

9 Claims, 9 Drawing Sheets

(56) References Cited

U.S. PATENT DOCUMENTS

| | | | |
|---|---|---|---|
| 2005/0225426 A1* | 10/2005 | Yoon | H04L 12/2803 340/3.21 |
| 2015/0348554 A1* | 12/2015 | Orr | H04L 12/282 704/275 |
| 2016/0098997 A1* | 4/2016 | Ding | G10L 15/22 704/275 |
| 2018/0158460 A1* | 6/2018 | Lee | H05B 47/12 |
| 2018/0176031 A1* | 6/2018 | Warren | H04L 12/2803 |
| 2019/0267004 A1* | 8/2019 | Lee | G06F 3/012 |

\* cited by examiner

APPARATUS AND METHOD FOR CONTROLLING OPERATION OF HOME APPLIANCE, HOME APPLIANCE AND METHOD FOR OPERATING OF HOME APPLIANCE

CROSS-REFERENCE TO RELATED APPLICATION

Pursuant to 35 U.S.C. § 119(a), this application claims the benefit of earlier filing date and right of priority to Korean Patent Application No. 10-2019-0066105, filed on Jun. 4, 2019, the contents of which are hereby incorporated by reference herein in its entirety.

BACKGROUND

1. Field of the Invention

The present disclosure relates to a home appliance control apparatus and method, a home appliance, and a home appliance operation method. More particularly, the present disclosure relates to a home appliance control apparatus and method, a home appliance, and a home appliance driving method, in which even if remote control of the home appliance is not possible in response to a voice command of an utterer due to a network failure in a 5G environment connected to the Internet of things, the operation of the home appliance can be remotely controlled and driven by communicating between a plurality of home appliances using a mutually agreed communication protocol in response to the voice command of the utterer.

2. Description of Related Art

Due to rapid industrial development, most households are equipped with home appliances such as a TV, a washing machine, a refrigerator, and an air cleaner. These home appliances may be controlled by a remote control device (for example, a remote controller) for the convenience of the user. That is, the user can conveniently control the home appliances using a remote controller. However, the remote controller must be provided to correspond to each of the home appliances. Therefore, as the number of home appliances increases, the number of remote controllers increases, and the user may have difficulty in determining which of the remote controllers corresponds to which of the home appliances. In addition, the remote controllers may be lost. In response to these issues, in order to facilitate the convenience of the user, studies for controlling the home appliance through a voice command continue to be undertaken.

In particular, Korean Patent Application Publication No. 10-2019-0042919 (hereinafter referred to as Related Art 1) and Korean Patent Application Publication No. 10-2014-0037519 (hereinafter referral to as Related Art 2) disclose techniques for interpreting a user's voice command to control operation of various home appliances on a home network.

Related Art 1 discloses a technique for automatically determining an electronic device to be controlled by voice recognition among a plurality of voice recognizable electronic devices, and transmitting a control command corresponding to a voice recognition result to the electronic device determined by a communication unit to operate the electronic device. However, in the case where a failure occurs in the communication unit, there is a limit in that the control commands corresponding to the voice recognition result may not be transmitted to the electronic device determined by the communication unit.

Related Art 2 discloses a technology in which various home appliances may be remotely controlled with commands inputted to a terminal in a natural-language interactive manner through voice, and wired/wireless communications may be used to remotely control the home appliances. However, in a case where a failure occurs in communication, there is a limit in that remote control of the home appliances may not be possible.

The above-described background technology is technical information that the inventors hold for the derivation of the present disclosure, or that the inventors acquired in the process of deriving the present disclosure. Thus, the above-described background technology cannot be regarded as known technology disclosed to the general public prior to the filing of the present application.

Prior Art 1: Korean Patent Application Publication No. 10-2019-0042919 (published on Apr. 25, 2014)

Prior art 2: Korean Patent Application Publication No. 10-2014-0037519 (published on Mar. 27, 2014)

SUMMARY

An aspect of the present disclosure is to solve the problem of the prior art in which a control command corresponding to a voice recognition result cannot be transmitted to an electronic device when a network failure has occurred.

Another aspect of the present disclosure is to solve the problem of the prior art in which a home appliance cannot be remotely controlled through voice when a network failure has occurred.

Another aspect of the present disclosure is to remotely control the operation of the home appliance by performing transmission and reception corresponding to a voice command of an utterer using a mutually agreed communication protocol between a plurality of home appliances when remote control of the home appliance is not possible in response to the voice command of the utterer due to a network failure.

Another aspect of the present disclosure is to provide a relay home appliance between two or more home appliances that exceed a communication range, thereby enhancing the accuracy of remote control results by extending the distance in which remote control is possible.

Another aspect of the present disclosure is to solve the problem of the prior art in which a signal corresponding to a speech recognition result cannot be transmitted to an electronic device in the event of a network failure, while using optimal process resources.

Another aspect of the present disclosure is to solve the problem of the prior art in which the home appliance cannot be remotely controlled through voice in the event of a network failure, while using optimal process resources.

It is be understood that the present disclosure is not limited to the above mentioned aspects, and other aspects and advantages of the present disclosure not mentioned above will become apparent from the following description, and will be more clearly understood by the embodiments of the present disclosure. It is also to be understood that the aspects and advantages of the present disclosure may be realized by means and combinations thereof set forth in the claims.

A home appliance control apparatus according to an embodiment of the present disclosure may include a feature of remotely controlling operation of a home appliance in response to a voice command of a utterer by communicating between a plurality of home appliances using a mutually agreed communication protocol, even if remote control of the home appliance is not possible in response to the voice command of the utterer due to a network failure.

More specifically, according to this embodiment of the present disclosure, the home appliance control apparatus may include a setting unit for setting one home appliance among the plurality of home appliances as a main home appliance and setting at least one of the remaining home appliances as a sub-home appliance when a voice command is received from an utterer, and a communication control unit for controlling the main home appliance and the sub-home appliance to communicate with each other using a mutually agreed communication protocol other than a pre-set network communication when a predetermined condition is satisfied.

Conventionally, when a network failure occurs, remote control of the home appliance by the voice command is not possible. However, through the home appliance control apparatus according to this embodiment, even if a network failure occurs, remote control of the home appliance can be easily performed by transmitting and receiving a signal corresponding to the voice command of the user using a mutually agreed communication protocol.

In addition, the communication control unit may control the main home appliance and the sub-home appliance to perform communication using the mutually agreed communication protocol when a failure occurs in the network communication.

Through the communication control unit according to this embodiment, remote control of the home appliance can be easily performed through the signal corresponding to the voice command regardless of the network state.

In addition, the setting unit may set, among a plurality of home appliances, a home appliance having a voice recognition function as a main home appliance.

Through the setting unit according to this embodiment, by setting the home appliance having the voice recognition function as the main home appliance, it is possible to remotely control the sub-home appliance that does not have a voice recognition function through the main home appliance, thereby improving the convenience of the user.

In addition, the setting unit may set, among the plurality of home appliances, one or more relay home appliances that relay communication between the main home appliance and the sub-home appliance using a mutually agreed communication protocol.

Through the setting unit according to this embodiment, the relay home appliance may be provided between two or more home appliances that have exceeded the communication range, to thereby extend the distance in which remote control is possible and improve the accuracy of the remote control result.

A home appliance according to another embodiment of the present disclosure may include a setting unit for setting, among a plurality of neighboring home appliances, at least one sub-home appliance as an object to transmit an operation signal corresponding to a voice command when the voice command is received from an utterer, and a communication control unit for transmitting an operation signal corresponding to the voice command to the at least one sub-home appliance using a mutually agreed communication protocol other than a pre-set network communication when a predetermined condition is satisfied.

Conventionally, when a network failure occurs, remote control of the home appliance by voice command is not possible. However, through the home appliance according to this embodiment, even if a network failure occurs, remote control of the home appliance can be easily performed by transmitting and receiving a driving signal corresponding to the voice command of a user using the mutually agreed communication protocol.

In addition, the communication control unit may transmit the operation signal corresponding to the voice command to the at least one sub-home appliance using the mutually agreed communication protocol other than the pre-set network communication, and receive an operation state of the sub-home appliance operated by the operation signal corresponding to the voice command using the mutually agreed communication protocol, when a failure occurs in the network communication.

Through the communication control unit according to this embodiment, it is possible to easily perform remote control of the sub-home appliance through transmission and reception of the signal corresponding to the voice command and operation state signals, irrespective of the network state.

In addition, the setting unit may set one or more relay home appliances that relay the communication using the mutually agreed communication protocol between the home appliance and the sub-home appliance.

Through the setting unit according to this embodiment, the relay home appliance may be provided between two or more home appliances that have exceeded the communication range to extend the distance in which remote control is possible and improve the accuracy of the remote control result.

According to still another embodiment of the present disclosure, a method for controlling a home appliance may include setting one home appliance among the plurality of home appliances as a main home appliance and setting at least one of the remaining home appliances as a sub-home appliance by means of a setting unit when a voice command is received from an utterer, and controlling the main home appliance and the sub-home appliance to communicate with each other using a mutually agreed communication protocol other than a pre-set network communication by means of a communication control unit when a predetermined condition is satisfied.

In addition, the controlling may include controlling the main home appliance and the sub-home appliance to perform communication using the mutually agreed communication protocol when a failure occurs in the network communication.

In addition, the setting may include setting, among the plurality of home appliances, any one home appliance having a voice recognition function as a main home appliance.

In addition, the setting may further include setting, among the plurality of home appliances, one or more relay home appliances that relay communication between the main home appliance and the sub-home appliance using the mutually agreed communication protocol.

According to yet another embodiment of the present disclosure, a method for operating of a home appliance may include setting, by means of a setting unit, at least one sub-home appliance among a plurality of neighboring home appliances as an object to transmit an operation signal corresponding to a voice command when the voice command is received from an utterer, and transmitting, by means of a communication control unit, the operation signal corresponding to the voice command to the at least one sub-home appliance using a mutually agreed communication protocol other than a pre-set network communication when a predetermined condition is satisfied.

In addition, the transmitting may include transmitting the operation signal corresponding to the voice command to the at least one sub-home appliance using the mutually agreed communication protocol other than the network communication when a failure occurs in the network communication.

In addition, the transmitting may further include receiving an operation state of the sub-home appliance operated by the operation signal corresponding to the voice command using the mutually agreed communication protocol.

In addition, the setting may further include setting one or more relay home appliances that relay communication between the main home appliance and the sub-home appliance using the mutually agreed communication protocol.

Other methods and systems for implementing embodiments of the present disclosure, and computer programs for executing the methods, may be further provided in addition to those described above.

Other aspects, features, and advantages than those described above will become apparent from the following drawings, claims, and detailed description of the present disclosure.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

The above and other objects, features and advantages of the present disclosure will become apparent from the following description of preferred embodiments given in conjunction with the accompanying drawings, in which.

DETAILED DESCRIPTION OF THE EMBODIMENTS

Figure 1:
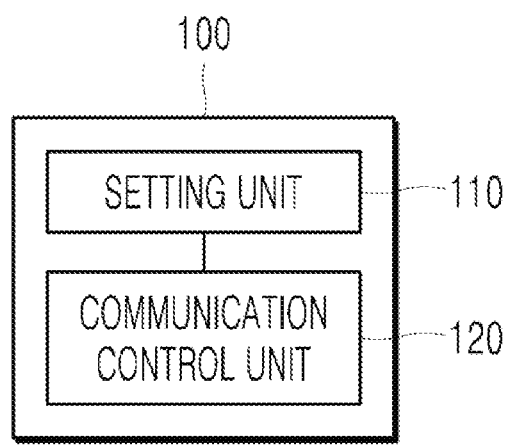
FIG. 1 is a schematic block diagram of a home appliance control apparatus according to an embodiment of the present disclosure.

Description will hereinafter be made more fully with reference to the accompanying drawings, in which exemplary embodiments are shown.

The terminology used herein is for the purpose of describing particular embodiments only, and is not intended to limit the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The advantages and features of the present disclosure, and the method of achieving them, will be apparent with reference to the embodiments described in detail in conjunction with the accompanying drawings. However, it should be understood that the present disclosure is not limited to the embodiments set forth herein, but may be embodied in many different forms and includes all conversions, equivalents, and alternatives falling within the spirit and scope of the present disclosure. The embodiments illustrated below are intended to fully explain the present disclosure and provided to fully illustrate the scope of the present disclosure to those skilled in the art. In describing the present disclosure, if the gist of the present disclosure may be blurred, the detailed description of the related arts will be omitted.

The terminology used in the present application is used only to describe a specific embodiment, and is not intended to limit the present disclosure. The singular expressions include plural expressions unless contextually expressly implies otherwise. It will be understood that in the present application, the terms such as "includes', "comprises", "having" and the like are used to specify the presence of a features, a number, a step, an operation, an element, a component, a part, or a combinations thereof in the specification, but do not preclude in advance the presence or addition possibility of one or more other features, numbers, steps, operations, elements, components, parts, or combinations thereof. The terms such as first, second, etc. may be used to describe various elements, but the elements should not be limited by the terms. The terms are used only for the purpose of distinguishing one component from another.

Hereinafter, the embodiments according to the present disclosure will be described in detail with reference to the accompanying drawings. In the following description, the same or corresponding components are denoted by the same reference numerals, and the redundant description thereof will be omitted.

FIG. 1 is a schematic block diagram of a home appliance control apparatus according to an embodiment of the present disclosure. Referring to FIG. 1, the home appliance control apparatus 100 may include a setting unit 110 and a communication control unit 120.

The setting unit 110 may set one home appliance among a plurality of home appliances (200a to 200g in FIG. 2) as a main home appliance, and set at least one of the remaining home appliances as a sub-home appliance when a voice command is received from an utterer.

Herein, the main home appliance refers to any one of the plurality of home appliances 200a to 200g, and may include a control subject that transmits an operation signal to the sub-home appliance and receives an operation state and/or an operation result signal from the sub-home appliance, while performing its own home appliance function. In addition, the sub-home appliance may include a control object of which operation can be controlled by the main home appliance, while performing its own home appliance function.

In this embodiment, in order to receive the voice command from the utterer, the setting unit 110 may further include a voice recognition module (not shown).

In this embodiment, the setting unit 110 may set one home appliance having a voice recognition function among a plurality of home appliances 200a to 200g as a main home appliance, and set at least one of the remaining home appliances as a sub-home appliance.

Herein, the voice recognition function refers to a technology that allows a home appliance to understand the voice command of the utterer and perform an operation in accordance with the understood voice command, and may include a technology that converts an acoustic signal of the voice command uttered by the utterer into words or sentences that the home appliance may understand, and operate the home appliance with the converted words or sentences. In this embodiment, the voice recognition function performed by the voice recognition module included in the setting unit 110 may include a technique of generating an operation signal of the home appliance corresponding to the voice command of the utterer when the voice command is received from the utterer:

The communication control unit 120 may control the main home appliance and the sub-home appliance to communicate with each other using a mutually agreed communication protocol other than a pre-set network communication when a predetermined condition is satisfied.

Herein, the predetermined condition may include a case where a failure occurs in the network communication. The occurrence of a failure in the network communication may include a case where a network coverage of a place where the home appliance is provided is not wide, and the network signal has a strength of less than a predetermined strength. The occurrence of a failure in the network communication may also include a case where the network connection is blocked due to a problem in the network equipment. The predetermined condition may also include a case where a network is not established in a place where one or more home appliances are provided.

In addition, the mutually agreed communication protocol may include a sound protocol capable of communicating among the plurality of home appliances 200a to 200g other than the predetermined network. The sound protocol may include previously agreed rules for converting and communicating control signals into a chirp signal that is outputted in the form of a sound. The chirp signal may be used in a short-range wireless communication technology (for example, having a range of within 10 m) since the chirp signal has characteristics of high temporal resolution and robustness to multipath attenuation, as a signal of which the frequency linearly increases (up-chirp) or decreases (down-chirp) with time. In this embodiment, each of the plurality of home appliances 200a to 200g may include a conversion unit (270 in FIGS. 3 and 4) for converting a set of signals (such as, for example, a driving signal of the sub-home appliance corresponding to a voice command and an operation result or an operation state of the sub-home appliance) into a chirp signal, and the chirp signal may be converted into a transmittable signal in an inaudible frequency band. The conversion of the chirp signal will be described below in detail with reference to FIGS. 3 and 4.

In addition, a possible communication control of the communication control unit 120 may include performing of communication between the home appliance and the sub-home appliance through a network 400 or a sound protocol, without intervention of the communication control unit 120, when the setting of the main home appliance and the sub-home appliance is completed. When the setting of the main home appliance and the sub-home appliance is completed, the communication control unit 120 may monitor the operation of the main home appliance and the sub-home appliance, and participate in the communication by a request from the main home appliance and/or the sub-home appliance to perform processing of the request and transmit the processing result to the main home appliance and/or the sub-home appliance.

In this embodiment, the setting unit 110 may set, among the plurality of home appliances 200a to 200g, one or more relay home appliances that relay communication between the main home appliance and the sub-home appliances using a sound protocol. Here, the relay home appliance may perform its own home appliance function, and include a relaying entity for relaying transmission/reception signals between the main home appliance and the sub-home appliance that is a target of communication when the distance between the main home appliance and the sub-home appliance that is the target of communication exceeds a communication range.

When the distance between the main home appliance and the sub-home appliance that is a target of communication exceeds the communication range, the setting unit 110 may set one or more of the plurality of home appliances as a relay home appliance, excluding the main home appliance and the sub-home appliance that is the target of communication. In addition, the setting unit 110 may set one or more relay home appliances that exist in the communication range and may communicate with the main home appliance using the sound protocol, and which exist in the communication range and may communicate with the sub-home appliance that is the target of communication using the sound protocol.

Figure 2:
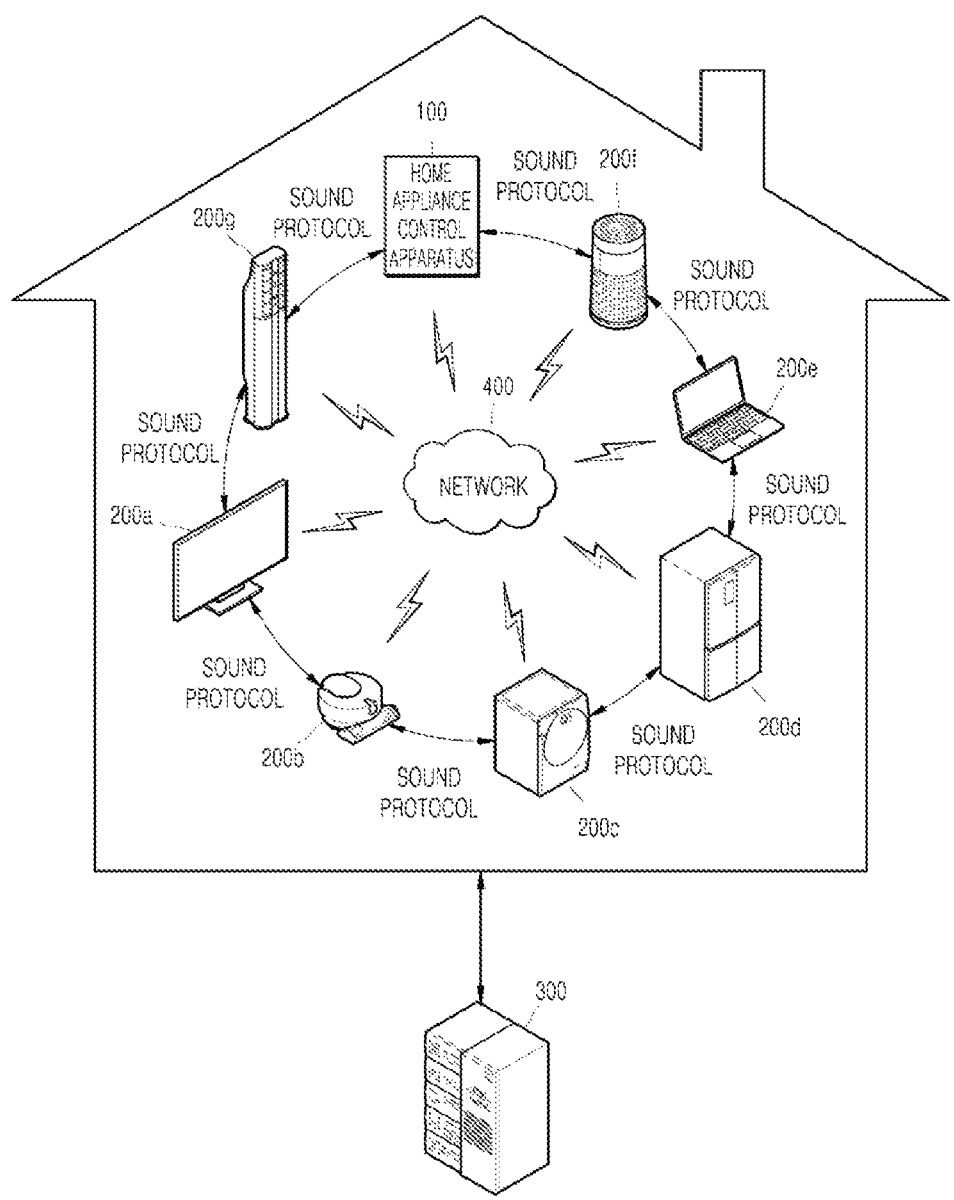
FIG. 2 illustrates an example of a home appliance control environment configured in a home according to an embodiment of the present disclosure, which includes a home appliance control apparatus, a plurality of home appliances, a server, a network connecting these to each other, and a sound protocol for connecting the plurality of home appliances to each other.

In this embodiment, the home appliance control apparatus 100 may be independently provided as shown in FIGS. 1 and 2, and may be provided inside the home appliances which may be a main home appliance among a plurality of home appliances 200a to 200g, or may be provided inside the server (300 in FIG. 2).

FIG. 2 is an exemplary diagram of a home appliance control environment configured according to an embodiment of the present disclosure, which includes a home appliance control apparatus, a plurality of home appliances, a server, a network for connecting these to each other, and a sound protocol for connecting the plurality of home appliances to each other. Such a control environment may be an Internet of things environment interconnected via 5G communication. In the following description, description of the parts overlapping with those of FIG. 1 will be omitted. Referring to FIG. 2, the home appliance control environment may include a home appliance control device 100, a plurality of home appliances 200, a server 300, and a network 400.

Figure 3:
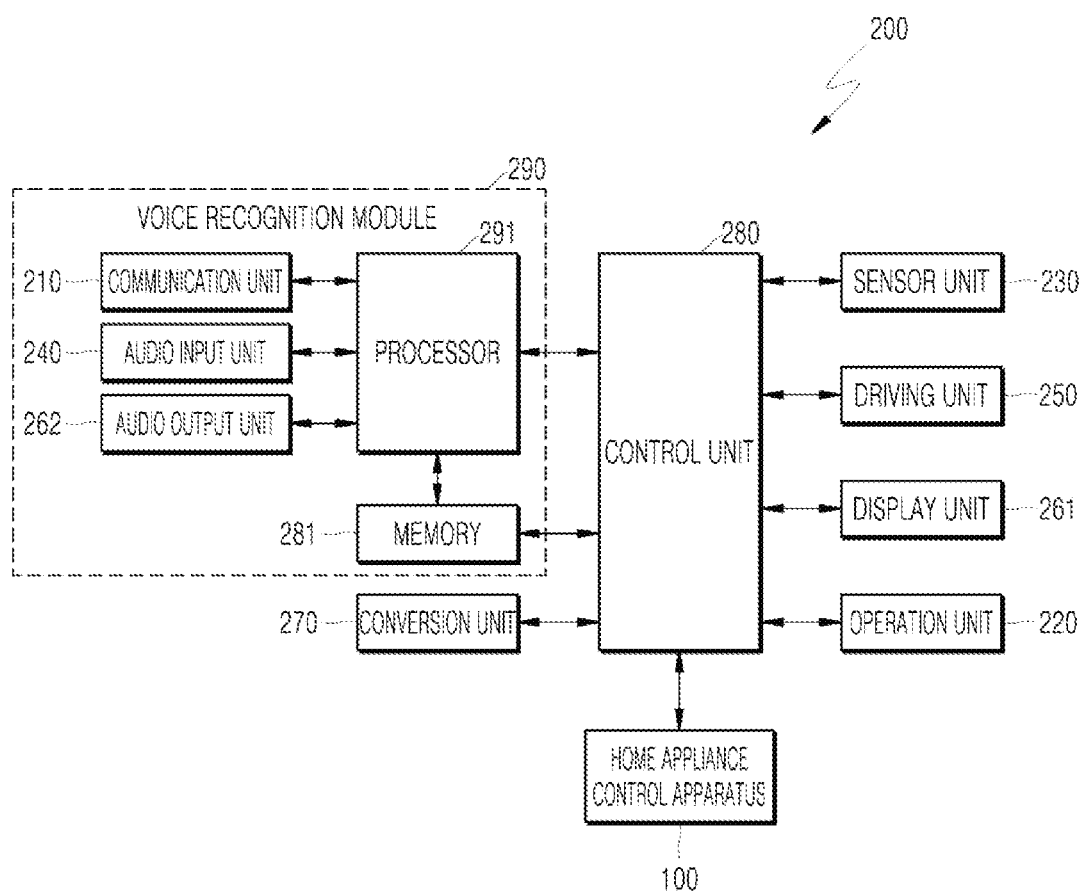
FIGS. 3 and 4 are schematic block diagrams of a home appliance according to an embodiment of the present disclosure.

In this embodiment, the control device 100 for the home appliances may exist independently as shown in FIGS. 1 and 2, and may be provided inside the home appliances which may be a main home appliance among the plurality of home appliances 200*a* to 200*g* as shown in FIG. 3. Also, the control device 100 may be provided inside the server (300 in FIG. 2).

When the home appliance control apparatus 100 exists independently as shown in FIGS. 1 and 2, the home appliance control apparatus 100 performs may perform a network communication with the plurality of home appliances 200*a* to 200*g* and/or the server 300. When a failure occurs in the network communication, the home appliance control apparatus 100 may communicate with the plurality of home appliances 200*a* to 200*g* using a sound protocol. The home appliance control apparatus 100 may store control information of the plurality of home appliances 200*a* to 200*g* when a failure occurs in the network communication, and then transmit the control information to the server 300 when the network communication is operating normally again.

In addition, when the home appliance control apparatus 100 is provided in the home appliance as shown in FIG. 3, the home appliance provided with the home appliance control apparatus 100 becomes the main home appliance, and among a plurality of neighboring home appliances, at least one sub-home appliance may be set as an object to transmit an operation signal corresponding to a voice command. When a network communication is operating normally, the main home appliance may perform the network communication with at least one neighboring sub-home appliance and/or the server 300. When a failure occurs in the network communication, the main home appliance may transmit the operation signal corresponding to the voice command to the sub-home appliance using a sound protocol, and receive an operation state and operation result signals from the sub-home appliance. When a failure occurs in the network communication, the main home appliance may store transmission/reception signals to and from the sub-home appliance. Then, when the network communication is operating normally again, the main home appliance may transmit the stored transmission/reception signals to the server 300.

The home appliance 200 may include, for example, a TV 200*a*, a robot cleaner 200*b*, a washing machine 200*c*, a refrigerator 200*d*, a notebook computer 200*e*, an air cleaner 200*f*, and an air conditioner 200*g* which are capable of communicating using the network 400 or using a sound protocol. However, examples of the home appliance 200 are not limited thereto.

Each of the home appliances 200 may send and receive data to and from each other to determine when a communication failure has occurred in the network 400 and may communicate using the sound protocol when the communication failure occurs in the network 400.

Among the plurality of home appliances 200, at least one home appliance having a voice recognition function may be set as a main home appliance. For example, the TV 200*a* having a voice recognition function may be set as one main home appliance, and the remaining home appliances 200*b* to 200*g* may be set as sub-home appliances. In addition, among the home appliances 200, at least one home appliance may be set as the main home appliance, wherein the at least one home appliance has a voice recognition function and is closest to the utterer, or has a voice recognition function and coincides with the image photographing direction and the face direction of the utterer. From FIG. 3, the TV 200*a* having a voice recognition function and being closest to the utterer may be set as the main home appliance, and the remaining home appliances 200*b* to 200*g* may be set as the sub-home appliances.

The main home appliance that receives the voice command for controlling the operation of the sub-home appliance from the utterer may generate a driving signal through analysis of the voice command, determine the sub-home appliance to be a target of communication, and transmit the driving signal to the sub-home appliance to be the target of communication. The target sub-home appliance receiving the driving signal may be driven to transmit its operation state and/or operation result to the main home appliance.

The server 300 may be a database server that provides big data needed to apply various artificial intelligence (AI) algorithms and data for operating the home appliance control apparatus 100. In addition, the server 300 may include a web server or an application server that enables remote control of the home appliance control apparatus 100 using the application or a web browser installed in a terminal (not shown) of an utterer.

Herein, the artificial intelligence (AI) is a field of computer engineering and information technology that researches methods to allow computers to think, learn, and self-improve, and the like that can be carried out by human intelligence, and may denote enabling a computer to imitate human intelligence.

Further, the artificial intelligence does not exist by itself, but is directly or indirectly related to other areas of computer science. In particular, nowadays, attempts are actively being made to solve problems occurring in various fields of information technology by introducing artificial intelligence into these fields.

Machine learning is an area of artificial intelligence that includes research areas that give a computer the ability to learn without explicit programming.

Specifically, machine learning is a technology that investigates and builds systems, and algorithms for such systems, which are capable of learning, making predictions, and enhancing their own performance on the basis of experiential data. Machine learning algorithms, rather than executing rigidly set static program commands, may be used to build models for deriving predictions and decisions from inputted data.

The server 300 may set, among the plurality of home appliances, one main home appliance and the remaining sub-home appliances, and control the main home appliance and the sub-home appliance to communicate using a mutually agreed communication protocol other than the pre-set network communication when a failure occurs in the network communication. That is, the operation control process of the home appliance may be performed by the server 300. To this end, the server 300 may communicate with the home appliance control apparatus 100 and/or the plurality of home appliances 200*a* to 200*g* via the network 400, or may communicate with the home appliance control apparatus 100 and/or the plurality of home appliances 200*a* to 200*g* using a sound protocol. In an alternative embodiment, when the communication using the sound protocol is not set in the server 300, learning may be performed using the information received from the home appliance control apparatus 100 when the communication of the network 400 is operating normally.

The network 400 may serve to connect the home appliance control apparatus 100, the plurality of home appliances 200*a* to 200*g*, and the server 300. The network 400 may include wired networks such as Local Area Networks (LANs), Wide Area Networks (WANs), Metropolitan Area Networks (MANs), Integrated Service Digital Networks (ISDNs), or wireless networks such as wireless LANs, CDMA, Bluetooth, satellite communications, but the scope of the present disclosure is not limited thereto. The network 400 may also send and receive information using local and/or remote communications. Further, the network 400 may send and receive information using local communication and/or remote communication. Here, the local communication may include Bluetooth®, Radio Frequency Identification (RFID), Infrared Data Association (IrDA), Ultrawideband (UWB), ZigBee and Wi-Fi (Wireless Fidelity) technologies, and the remote communication may include Code Division Multiple Access (CDMA), Frequency Division Multiple Access (FDMA), Time Division Multiple Access (TDMA), Orthogonal Frequency Division multiple access (OFDMA), and Single Carrier Frequency Division multiple access (C-FDMA).

The network 400 may include connection of network elements such as hubs, bridges, routers, switches, and gateways. The network 400 may include one or more connected networks, such as a multi-network environment, including a public network such as the Internet and a private network such as a secure corporate private network. The access to the network 400 may be provided via one or more wired or wireless access networks.

FIG. 3 is a schematic block diagram of a home appliance according to an embodiment of the present disclosure, which shows a schematic block diagram of a main home appliance. In the following description, description of the parts that are the same as those in FIGS. 1 and 2 will be omitted. Referring to FIG. 3, the main home appliance (any one of 200a to 200g) may include a home appliance control apparatus 100, a communication unit 210, an operation unit 220, a sensor unit 230, an audio input unit 240, an output unit 260 including a driving unit 250, a display unit 261 and an audio output unit 262, a conversion unit 270, a control unit 280, a memory 281, and a processor 291. In this embodiment, the communication unit 210, the audio input unit 240, the audio output unit 262, the memory 281, and the processor 291 may be included in the voice recognition module 290.

In this embodiment, the home appliance control apparatus 100 provided in the main home appliance may include a setting unit 110 and a communication control unit 120. When a voice command is received from an utterer, the setting unit 110 may set, among a plurality of neighboring home appliances, at least one sub-home appliance as an object to transmit an operation signal corresponding to a voice command Herein, "neighboring" means that a plurality of home appliances including a main home appliance and one or more sub-home appliances are disposed at different locations in the same space, or may be disposed in a home or living space to be connected to each other through a single network. Also, each of the plurality of home appliances may be located at a location such that the home appliances are capable of performing a sound protocol communication with each other or through another home appliance.

The communication control unit 120 may transmit the operation signal corresponding to the voice command to the at least one sub-home appliance using a mutually agreed communication protocol, that is, a sound protocol, other than a pre-set network communication, when a failure occurs in the network communication. Also, the communication control unit 120 may receive, from the sub-home appliance through the sound protocol, the operation state and/or operation result of the sub-home appliance operated by the operation signal.

In an alternative embodiment, when there is more than one home appliance with a voice recognition function other than the main home appliance, in order to set a main home appliance, the setting unit 110 may set any one home appliance that is located at a position closest to the utterer as the main home appliance. Herein, two or more home appliances with a voice recognition function may share information (for example, distance information to an utterer) for setting the main home appliance using a sound protocol with each other. Also, the meaning of "located at a position closest to the utterer" may include a case where the physical distance between the utterer and the home appliance is closest, and the meaning of "the physical distance between the utterer and the home appliance is closest" is that the home appliance is able to receive the highest (or loudest) voice command signal of the utterer. A proximity sensor (included in the sensor unit 230 in FIGS. 3 and 4) may be provided inside the home appliance, so that the distance between the utterer and the home appliance may be measured.

In an alternative embodiment, when there is more than one home appliance with a voice recognition function other than the main home appliance, in order to set the main home appliance, the setting unit 110 may set any one home appliance that match a face direction of the utterer and an image photographing direction of the utterer within an error range as the main home appliance. Herein, two or more home appliances with a voice recognition function may share information (for example, the difference information between the face direction of the utterer and the image photographing direction of the utterer) with each other for setting the main home appliance using the sound protocol. In addition, if the face direction of the utterer matches the image photographing direction of the utterer within the error range, it may mean that the one main home appliance is in a state of receiving the highest (or loudest) voice command signal of the utterer, or that the one main home appliance is in a state in which the utterer is ready to utter the voice command to the home appliance. An image sensor (included in the sensor unit 230 in FIGS. 3 and 4) is provided inside the home appliance so that the image of the utterer may be photographed, and it may be determined whether or not the face direction of the utterer matches the image photographing direction within the error range.

In an alternative embodiment, the setting unit 110 may set one or more relay home appliances that relay communication between a plurality of sub-home appliances using a sound protocol. When the distance to the sub-home appliance that is a target of communication exceeds the communication range, the setting unit 110 may set one or more of the plurality of home appliances, excluding the sub-home appliance that is the target of communication, as a relay home appliance.

The communication unit 210 may provide a communication interface required to provide transmission/reception signals between pluralities of home appliances 200a to 200g in the form of packet data, in cooperation with the network 400. In addition, the communication unit 210 may provide a communication interface required to provide transmission/reception signals between the plurality of home appliances 200a to 200g and the terminals of the utterer in the form of packet data. Further, the communication unit 210 may provide a communication interface required to perform communication between pluralities of home appliances 200a to 200g using a sound protocol in the event of a failure in the network.

The operation unit 220 may include a plurality of operation buttons (not shown), and may transmit a signal corresponding to the input button to the control unit 280. In this embodiment, in the case of the TV 200a, the operation unit 220 may include a series of operation buttons for turning on and off the power, changing the channel, and adjusting the volume. The operation unit 220 may include a series of operation buttons for turning on and off the power, adjusting the temperature, and selecting the operation mode in a case of the air conditioner 200g. In this way, the operation unit 220 may include operation buttons for inputting in order to control the operation of the home appliance 200.

The sensor unit 230 may include a proximity sensor (not shown) and an image sensor (not shown) for sensing the surrounding context of the home appliance 200. The proximity sensor may acquire position data of an object (such as an utterer) located around the home appliance 200 by using, for example, an infrared ray. Meanwhile, the position data of the user acquired by the proximity sensor is outputted to the controller 280. The controller 280 may calculate the distance to the utterer based on the home appliance 200, and store the calculated distance in the memory 281. The control unit 280 may calculate the distance between the utterer and the home appliance 200 by analyzing a difference between time information on the time when the proximity sensor emits a signal and time information on the time when the emitted signal is reflected back from the user The image sensor may include a camera (not shown) capable of photographing the surroundings of the home appliance 200, and a plurality of image sensors may be installed for photographing efficiency. For example, the camera may include an image sensor (such as a CMOS image sensor) configured to include at least one optical lens and a plurality of photodiodes (such as pixels) that are imaged by light passing through the optical lens, and a digital signal processor (DSP) that forms an image based on the signals outputted from the photodiodes. The digital signal processor may generate a moving image composed of still frames, as well as frames composed of the still images. Meanwhile, the image photographed by the camera as the image sensor may be stored in the memory 281, and the control unit 280 may receive the image of the utterer captured by the image sensor and determine whether the face direction of the utterer matches the image photographing direction of the utterer within the error range.

In this embodiment, the sensor 230 may be a proximity sensor and an image sensor, but the present disclosure is not limited thereto. For example, a sensor capable of sensing the surrounding situation of the home appliance 200 may include various sensors such as a temperature sensor, a humidity sensor, and a vibration sensor, and the information sensed by the sensor unit 230 may be stored in the memory 281.

The audio input unit 240 may receive a speech sound (such as a voice command) uttered by an utterer. To this end, the audio input unit 240 may include one or more microphones (not shown). In addition, a plurality of microphones (not shown) may be provided to more accurately receive the speech sound of the user. Herein, each of the plurality of microphones may be spaced and disposed at different positions, and the received speech sound of the user may be processed as an electrical signal.

The driving unit 250 performs an operation implemented in the home appliance 200, and may be configured differently for each home appliance 200. For example, when the home appliance is the robot cleaner 200b, the driving unit 250 may include a fan motor driving unit for air suction. As another example, when the home appliance is a washing machine 200c, the driving unit 250 may include a driving unit for driving the drum. As another example, when the home appliance is a refrigerator (200d), the driving unit 250 may include, for example, a refrigerator compartment driving unit for operating a refrigerator compartment fan for supplying cooled air to the refrigerating compartment, a freezer compartment driving unit for operating a freezer compartment fan for supplying cooled air to the freezer compartment, a compressor driving unit for operating a compressor for compressing the refrigerant, and the like. As another example, when the home appliance is the air cleaner 200f, the driving unit 250 may include, for example, a compressor driving unit for driving the compressor in an outdoor unit, an outdoor unit fan driving unit for operating the outdoor unit fan for heat exchange, and an indoor unit fan drive unit for operating the indoor unit fan for heat exchange.

The output unit 260 may include a display unit 261 and an audio output unit 262. The display unit 261 may display, for example, information corresponding to a command inputted by a user (including an utterer), a processing result corresponding to the command inputted by the user, an operation mode, an operation state, an error state, update version information, update history information, and a build number, as an image. According to the embodiment, the display unit 261 may be configured as a touch screen by forming a mutual layer structure with a touch pad. In this case, the display unit 261 may be used as an input unit capable of inputting information by the user's touch in addition to the output unit.

The audio output unit 262 may output, for example, a notification message such as a warning sound, an operation mode, an operation state, and an error state, information corresponding to a command inputted by the user and a processing result corresponding to the command inputted by the user, as audio. The audio output unit 262 may convert and output an electric signal from the control unit 280 into an audio signal. For this purpose, a speaker or the like may be provided.

The conversion unit 270 may analyze the voice command inputted through the audio input unit 240, and may convert the driving signal of the sub-home appliance corresponding to the voice command into chirp data (or a chirp signal) by data mapping.

The conversion unit 270 may convert the driving signal of the sub-home appliance inputted through the audio input unit 240 into chirp data that can be transmitted in an inaudible frequency band. That is, when outputting the chirp data using an audible frequency band (16 Hz to 20 kHz) that can be heard by a person, a sound is outputted every time the home appliance 200 is controlled, and the sound may be felt by the user and surrounding people as noise. Therefore, in this embodiment, since the conversion unit 270 converts the voice command into the chirp data that can be transmitted in the inaudible frequency band, the user does not feel the chirp data even if the data is outputted.

Figure 4:
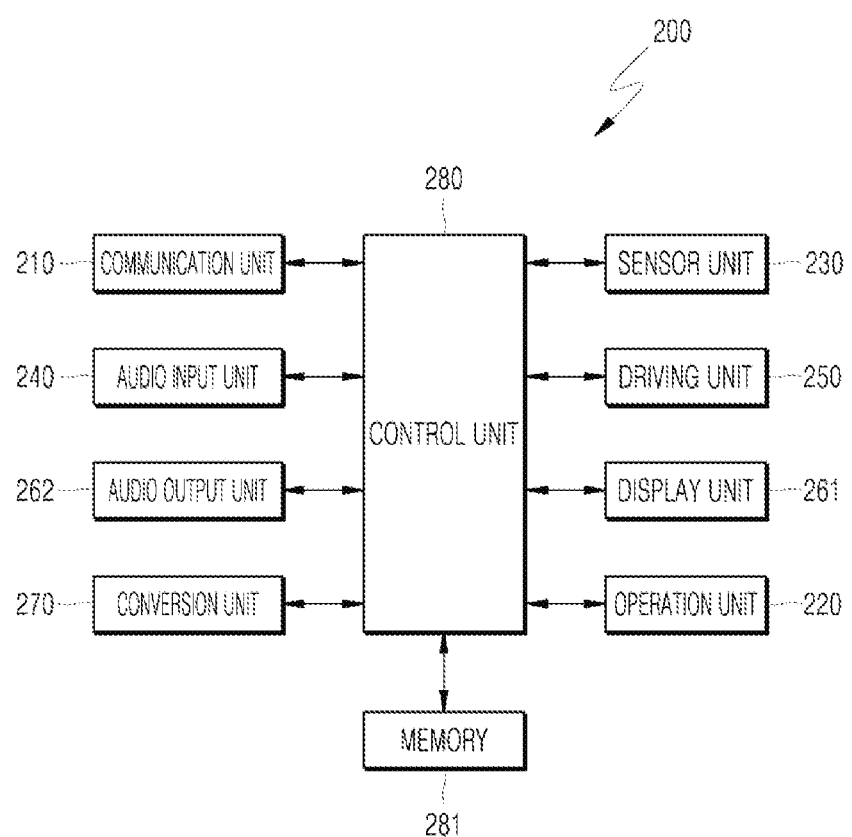

The conversion unit 270 may convert the voice command of the utterer into a chirp signal when provided to the main home appliance as shown in FIG. 3, and convert the operation state and/or the operation result of the sub-home appliance itself into a chirp signal when provided to the sub-home appliance as shown in FIG. 4. In addition, the conversion unit 270 may convert a chirp signal for the operation state and/or the operation result of the sub-home appliance received from the sub-home appliance into the driving signal of the original sub-home appliance, when provided to the main home appliance as shown in FIG. 3, and convert a chirp signal for a driving signal of the sub-home appliance corresponding to the voice command received from the main home appliance into a driving signal of the sub-home appliance corresponding to the original voice command, when provided to the sub-home appliance as shown in FIG. 4.

The control unit 280 may control the entire operation of the main home appliance in conjunction with the home appliance control apparatus 100. The control unit 280 is a kind of central processing unit, and may drive the control software installed in the memory 160 and control the display unit 170 and/or the audio output unit 180 to provide various functions such as outputting the result of the utterance processing.

Herein, the control unit 280 may include all kinds of devices capable of processing data, such as a processor: In addition, the processor may be, for example, a data processing device embedded in hardware, having physically structured circuitry to perform the functions represented by code or instructions contained within a program. As examples of the data processing apparatus embedded in such hardware, a microprocessor, a central processing unit (CPU), a processor core, a multiprocessor, an application-specific integrated circuit (ASIC) circuit, and a field programmable gate array (FPGA) may be included, but the scope of the present disclosure is not limited thereto.

In this embodiment, the control unit 280 may analyze the voice command of the utterer to generate a driving signal of the sub-home appliance, set the sub-home appliance in response to the driving signal, and perform machine learning, such as deep learning, in order to transmit an operation signal corresponding to a voice command to at least one sub-home appliance using a sound protocol when a failure occurs in the network communication. The memory 281 may store data used, for example, for the machine learning and the result data.

Deep learning, which is a type of machine learning, can learn to a deeper level of learning based on data. The deep learning can represent a set of machine learning algorithms that extract key data from a plurality of data as the step is increased.

The deep learning structure may include an artificial neural network (ANN). For example, the deep learning structure may be configured as a deep neural network (DNN), such as, for example, a convolution neural network (CNN), a recurrent neural network (RNN), and a deep belief network (DBN). The deep learning structure according to this embodiment can use various known structures. For example, the deep learning structure according to the present disclosure may include CNN, RNN, DBN, and the like. The RNN is widely used in, for example, natural language processing, and may be configured to construct an artificial neural network structure by stacking layers at each moment with an effective structure for time-series data processing that varies with time. The DBN may include a deep learning structure constructed by stacking multi-layered Restricted Boltzmann Machine (RBM) as a deep learning technique. By repeating the RBM learning, if the certain number of layers is formed, a DBN having a corresponding number of layers can be constituted. The CNN may include a model that simulates a person's brain function based on the assumption that when a person recognizes an object, after extracting the basic features of the object, a complex calculation is performed in the brain and the object is recognized based on the result of the calculation.

Meanwhile, the artificial neural network learning can be achieved by adjusting the weight of the inter-node interconnections (and also adjusting the bias value if necessary) so that the desired output is obtained for a given input. In addition, the artificial neural network can continuously update the weight value by learning. Further, a back propagation may be used for learning of the artificial neural network.

Further, the artificial neural network can be installed in the main home appliance, such that user recognition and user's tone recognition can be performed based on machine learning in which a received voice input signal is used as input data.

The control unit 280 may include an artificial neural network, for example, a deep neural network (DNN) such as CNN, RNN, and DBN to learn a neural network. As a machine learning method of the artificial neural network, both unsupervised learning and supervised learning can be used. The control unit 280 may control to update the tone recognition artificial neural network structure after learning, according to the setting.

The memory 281 is for recording various information required in the operation of the home appliance control apparatus 100, and may include a volatile or a nonvolatile recording medium. The recording medium is for storing data that can be read by the control unit 280 and may include a hard disk drive (HDD), a solid state disk (SSD), a silicon disk drive (SDD), a ROM, a RAM, a CD-ROM, a magnetic tape, a floppy disk, a optical data storage device, and the like.

In this embodiment, the communication unit 210, the audio input unit 240, the audio output unit 262, the memory 281, and the processor 291 may be included in the voice recognition module 290.

In this embodiment, the voice recognition module 290 may include a communication unit 210 for transmitting a driving signal and/or various information corresponding to a voice command to other home appliances, an audio input unit 240 for receiving the voice command, an audio output unit 262 for outputting fixed information as audio, and a processor 291 for generating a driving signal of the sub-home appliance by analyzing the voice command using a voice recognition algorithm. In this embodiment, the voice recognition module 290 may be provided in various electronic devices in addition to the home appliance shown in FIG. 3. Otherwise, the voice recognition module 290 may be used as a separate device without being provided in another electronic device.

FIG. 4 is a schematic block diagram of a home appliance according to another embodiment of the present disclosure, and is a schematic block diagram of a sub-home appliance. In the following description, description of the parts which are the same as those in the description of FIGS. 1 to 3 will be omitted. Referring to FIG. 4, in comparison with FIG. 3, the sub-home appliance may not include the home appliance control apparatus 100 and the voice recognition module 290. That is, it can be seen from FIG. 4 that the processor 291 is not provided in the sub-home appliance.

Figure 5:
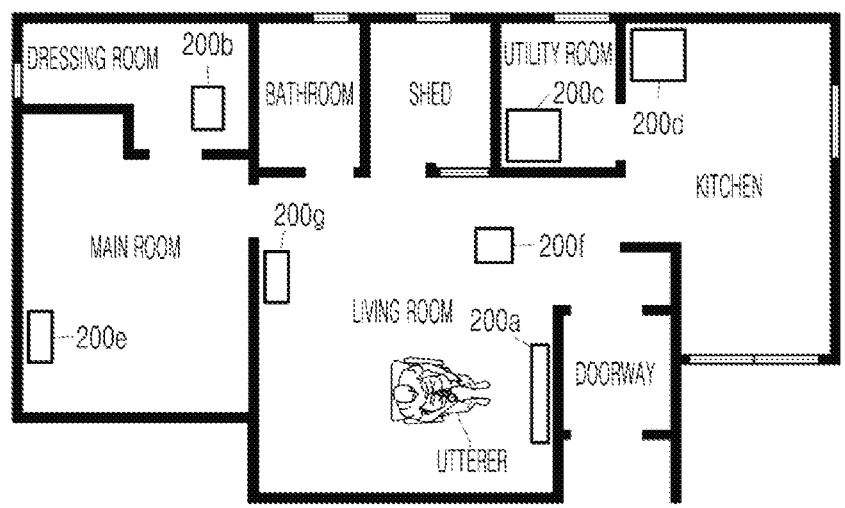
FIG. 5 is a layout diagram of a plurality of home appliances provided in a home according to an embodiment of the present disclosure.
Figure 6:
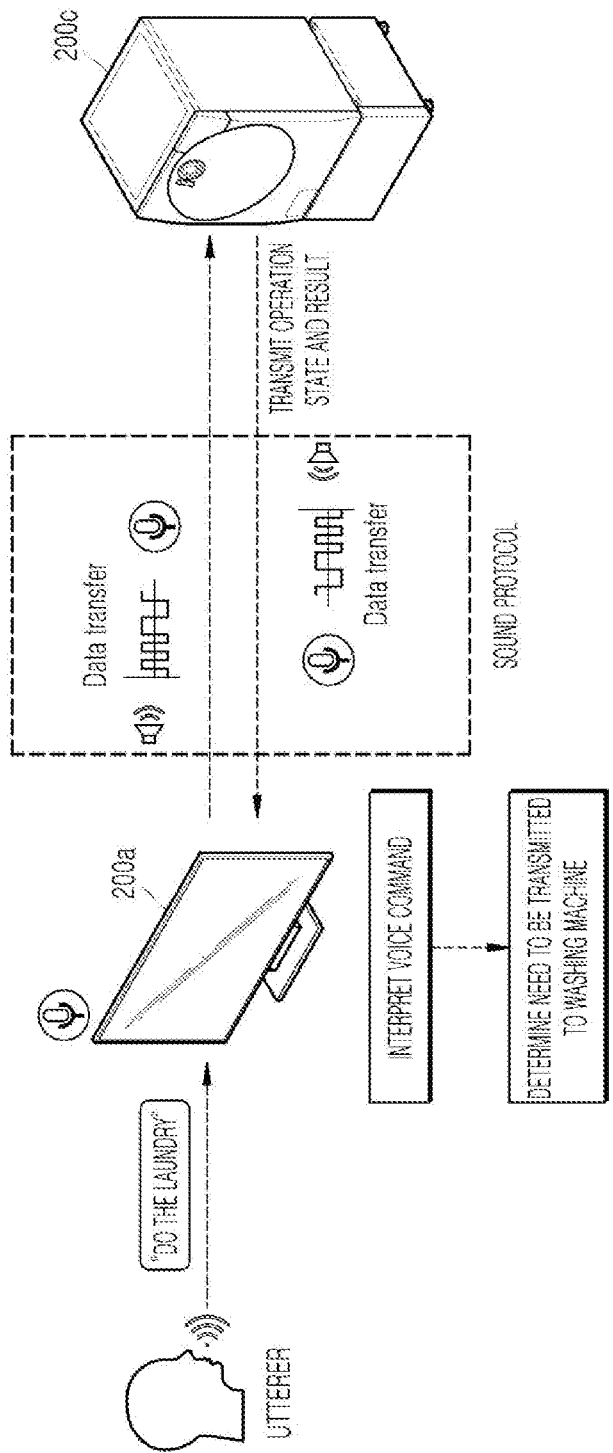
FIGS. 6 and 7 are exemplary diagrams illustrating home appliance control performed by a home appliance control apparatus according to an embodiment of the present disclosure.
Figure 7:
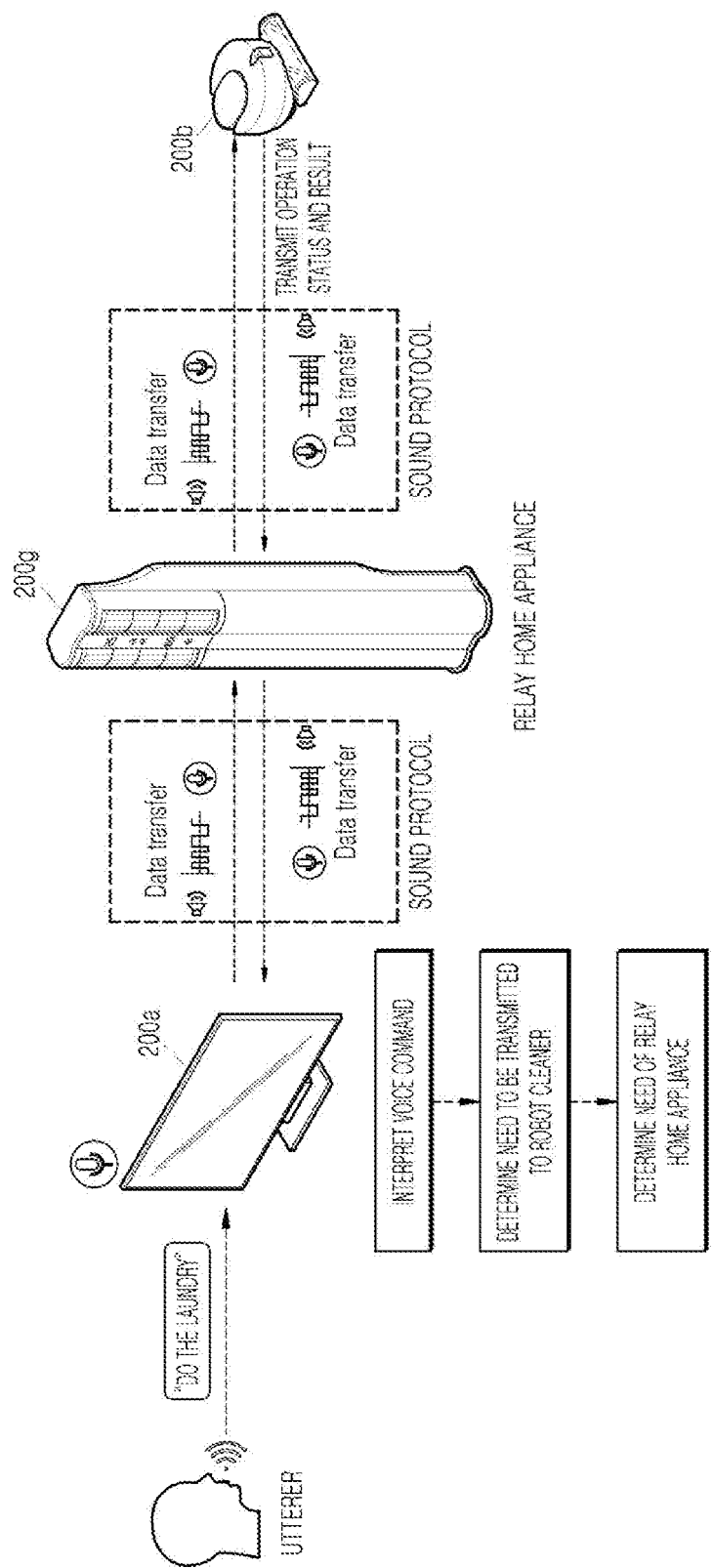

FIG. 5 is a layout diagram of a plurality of home appliances provided in a home according to an embodiment of the present disclosure, and FIGS. 6 and 7 are exemplary diagrams illustrating home appliance control performed by a home appliance control apparatus according to an embodiment of the present disclosure. In the following description, description of the parts which are the same as those in the description of FIGS. 1 to 4 will be omitted. Referring to FIG. 5, a TV 200a, an air cleaner 200f, and an air conditioner 200g are disposed in the living room, a robot cleaner 200b is disposed in the dressing room, a washing machine 200c is disposed in the utility room, a refrigerator 200d is disposed in the kitchen, and a notebook computer 200e is disposed in the main room. Also, among the home appliances shown in FIG. 5, at least one home appliance with a voice recognition function may be provided with a home appliance control apparatus 100 including a setting unit 110 and a communication control unit 120.

Referring to FIGS. 5 and 6, a case where an utterer who is watching a TV 200a in a living room wants to operate a washing machine 200c in a utility room will be described under the assumption that a network failure has occurred. Each of the home appliances can periodically determine whether there has been a network failure by transmitting and receiving signals, and communicate with each other using a sound protocol when the network failure has occurred.

First, an utterer who is watching TV 200a in the living room may utter a voice command of "Do the laundry".

While the TV 200a and the air conditioner 200g, which are in the vicinity of the utterer and have the voice recognition function, receive the voice command of the utterer, since the TV 200a is closer to the utterer or the utterer's face is directed to the TV 200a, the TV 200a may be set as the main home appliance, and the remaining home appliances may be set as the sub-home appliances. Herein, the TV 200a and the air conditioner 200g may respectively receive the voice command of the utterer and then share with each other, through the sound protocol communication, the distance calculation information with the utterer and/or the image capturing information of the utterer, and share with each other that the TV 200a, which is closer to the utterer, has been set as the main home appliance.

The TV 200a, which has been set as the main home appliance, may interpret the voice command of the utterer to determine that the sub-home appliance to operate as the target is the washing machine 200c, and generate a driving signal to drive the washing machine 200c in response to the voice command of the utterer. Herein, each of the plurality of home appliances 200a to 200g stores control codes of the home appliances other than itself, and/or location information of the home appliances in the home, so that the set main home appliance (TV 200a) may receive and interpret the voice command of the utterer to determine that the sub-home appliance (washing machine 200c) to operate as the target and generate the driving signal to drive the sub-home appliance (washing machine 200c).

In an alternative embodiment, while the main home appliance (TV 200a) transmits a driving signal corresponding to the voice command of the utterer to all the sub-home appliances 200b to 200g and requests a response of a sub-home appliance that can be driven by the driving signal, if the main home appliance (TV 200a) receives a response signal from the sub-home appliance (washing machine 200c) that can be driven by the driving signal, the main home appliance (TV 200a) may determine the sub-home appliance (washing machine 200c) that has transmitted the response signal as the sub-home appliance (washing machine 200c) to be operated as a target The TV 200a which has been set as the main home appliance may transmit the driving signal to the washing machine 200c as the target sub-home appliance, and the washing machine 200c may perform washing. In this case, the washing machine 200c may transmit its own operation state and/or operation result to the TV 200a as a main home appliance through communication using a sound protocol, and the TV 200a may output the operation state and/or operation result of the washing machine 200c to the utterer.

Referring to FIGS. 5 and 7, a case where an utterer who is watching a TV 200a in a living room wants to operate a robot cleaner 200c in the dressing room will be described under the assumption that a network failure has occurred. Each of the home appliances can periodically determine whether there has been a network failure by transmitting and receiving signals, and can communicate with each other using a sound protocol when the network failure has occurred.

First, an utterer who is watching the TV 200a in the living room may utter a voice command of "Clean the house".

While the TV 200a and the air conditioner 200g, which are in the vicinity of the utterer and have the voice recognition function, receive the voice command of the utterer, since the TV 200a is closer to the utterer or the utterer's face is directed to the TV 200a, the TV 200a may be set as the main home appliance, and the rest may be set as the sub-home appliances. Here, the TV 200a and the air conditioner 200g may respectively receive the voice command of the utterer and then share with each other, through the sound protocol communication, the distance calculation information with the utterer and/or the image capturing information of the utterer, and share with each other that the TV 200a closer to the utterer is set as the main home appliance.

The TV 200a, which has been set as the main home appliance, may interpret the voice command of the utterer to determine that the sub-home appliance to operate as the target is the robot cleaner 200b, and generate a driving signal to drive the robot cleaner 200b in response to the voice command of the utterer.

However, when the TV 200a serving as a main home appliance and the robot cleaner 200b serving as a sub-home appliance to be operated as a target exceed a communication range (for example, 10 m) using a sound protocol, the TV 200a can set a relay home appliance.

While the TV 200a transmits the driving signal to the robot cleaner 200b using the sound protocol, when the TV 200a fails to receive a response signal from the robot cleaner 200b, it is determined that the distance between the TV 200a and the robot cleaner 200b exceeds the communication range. In this case, the TV 200a can set the air conditioner 200g, which can communicate with both the TV 200a and the robot cleaner 200b in the communication range, as the relay home appliance.

The TV 200a may transmit, to all the sub-home appliances 200b to 200g, a request signal for setting the relay home appliance capable of communicating with the target sub-home appliance (the robot cleaner 200b) using the sound protocol. When the TV 200a receives a response signal from one or more sub-home appliances (excluding the target sub-home appliance (the robot cleaner 200b)) capable of operating as a relay home appliance, the corresponding sub-home appliance may be set as the relay home appliance (the air conditioner 200g). If the relay home appliances are more than two (the notebook 200e, the air conditioner 200g), the TV 200a may set the target sub-home appliance which is closer to the robot cleaner 200b (the air conditioner 200g) as the relay home appliance.

When the setting of the relay home appliance is completed, the TV 200a, which has been set as the main home appliance, may transmit the driving signal to the robot cleaner 200b as a sub-home appliance to be operated as a target through the air conditioner 200g as a relay home appliance, so as to allow the robot cleaner 200b to perform cleaning. In this case, the robot cleaner 200b transmits its operation state and/or operation result to the TV 200a as the main home appliance through the air conditioner 200g as the relay home appliance, so that the TV 200a may output the operation state and the operation result of the robot cleaner 200b to the utterer.

Figure 8:
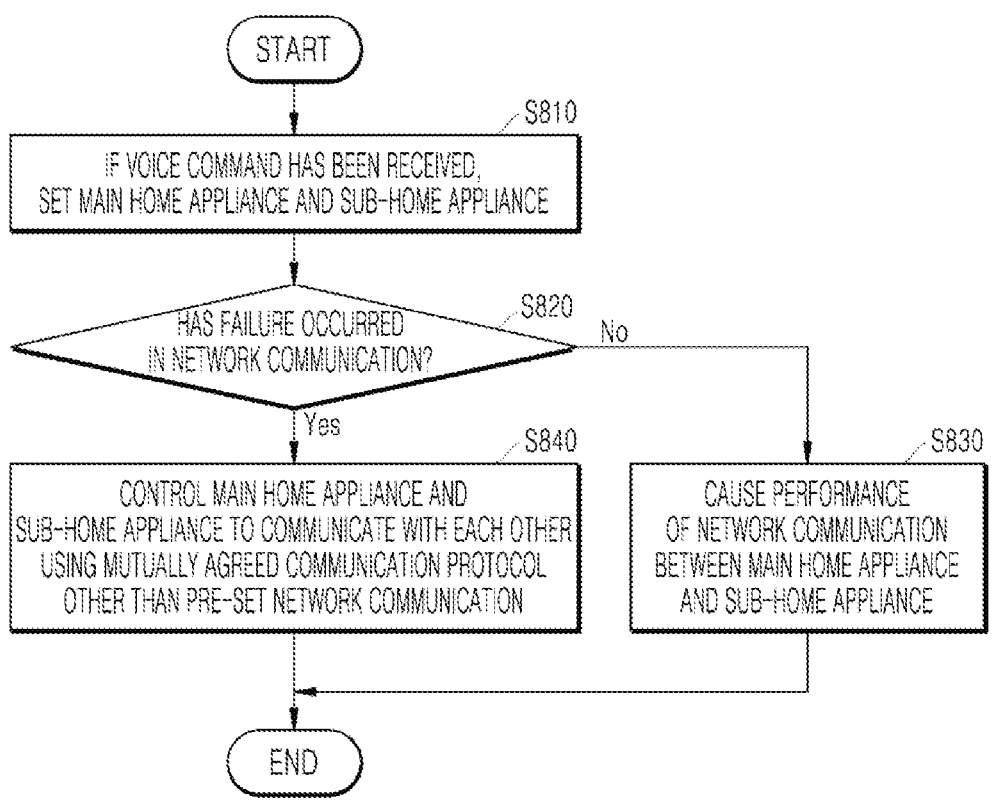
FIG. 8 is a flowchart illustrating a home appliance control method according to an embodiment of the present disclosure.

FIG. 8 is a flowchart illustrating a home appliance control method according to an embodiment of the present disclosure. In the following description, description of the parts overlapping with those of FIGS. 1 to 7 will be omitted.

Referring to FIG. 8, in step S810, when the home appliance control apparatus 100 receives the voice command from the utterer, the home appliance control apparatus 100 sets one main home appliance among a plurality of home appliances (200a to 200g in FIG. 2) as a main appliance, and sets at least one of the remaining home appliances as a sub-home appliance.

Herein, the main home appliance refers to any one of the plurality of home appliances 200a to 200g, and may include a control subject that transmits an operation signal to the sub-home appliance and receives an operation state and/or an operation result signal from the sub-home appliance, while performing its own home appliance function. In addition, the sub-home appliance may include a control object of which operation can be controlled by the main home appliance, while performing its own home appliance function.

In step S820, when the home appliance control apparatus 100 has completed the setting of the main home appliance and the sub-home appliance, the home appliance control apparatus 100 determines whether a failure has occurred in the network communication Here, the occurrence of a failure in the network communication may include a case where the network coverage of the location where the home appliance may be provided is not wide, and the network signal has a strength of less than a predetermined strength. The occurrence of a failure in the network communication may also include a case where the network connection is blocked due to a problem in the network equipment In step S830, the home appliance control apparatus 100 may cause performance of the network communication between the main home appliance and the sub-home appliance when network communication is operating normally.

In step S840, when the home appliance control apparatus 100 determines that a failure has occurred in the network communication, the home appliance control apparatus 100 controls the main home appliance and the sub-home appliance to communicate with each other using a mutually agreed communication protocol, that is, a sound protocol, other than the pre-set network communication.

In an alternative embodiment, the home appliance control apparatus 100 may set one or more relay home appliances that relay the communication between the main home appliance and the sub-home appliance using the sound protocol. When the distance between the main home appliance and the sub-home appliance that is a target of communication exceeds the communication range, the home appliance control apparatus 100 may set one of a plurality of home appliances, excluding the main home appliance and the sub-home appliance that is the target of communication, as the relay home appliance.

Figure 9:
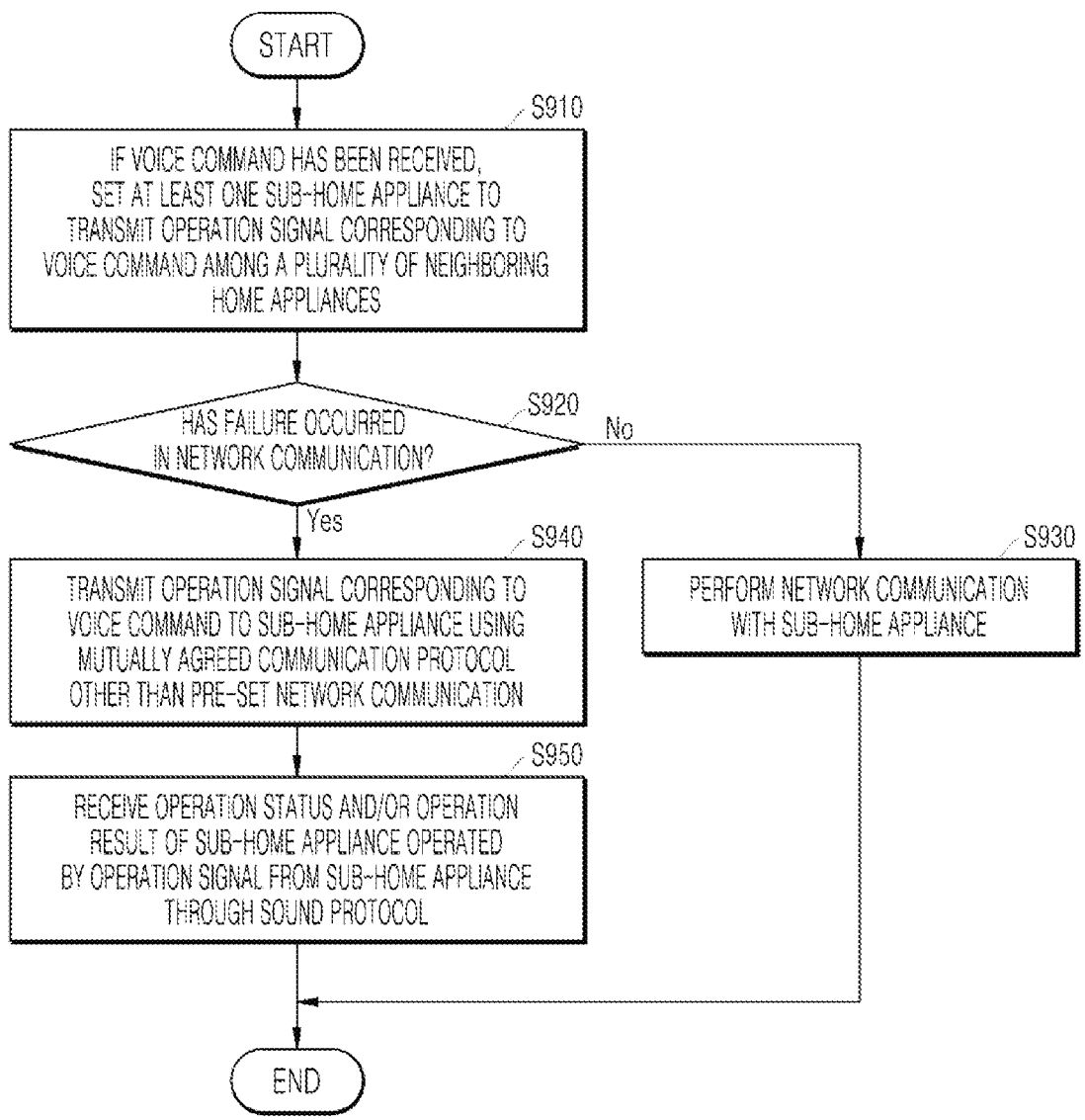
FIG. 9 is a flowchart illustrating a method for operating a home appliance according to an embodiment of the present disclosure.

FIG. 9 is a flowchart illustrating a method of operating a home appliance according to an embodiment of the present disclosure. In the following description, description of the parts overlapping with those of FIGS. 1 to 8 will be omitted.

Referring to FIG. 9, in step S910, when the home appliance 200 receives a voice command from an utterer, the home appliance 200 may set, among a plurality of neighboring home appliances, at least one sub-home appliance as an object to transmit an operation signal corresponding to the voice command Here, the home appliance 200 may be the main home appliance described above.

In step S920, when the home appliance 200 has completed the setting of the sub-home appliance, the home appliance 200 determines whether a failure has occurred in the network communication. Here, the occurrence of a failure in the network communication may include a case where the network coverage of the location where the home appliance is provided is not wide, and the network signal has a strength of less than a predetermined strength. The occurrence of a failure in the network communication may also include a case where the network connection is blocked due to a problem in the network equipment In step S930, the home appliance 200 performs network communication with the sub-home appliance when the network communication is operating normally.

In step S940, when the home appliance 200 determines that a failure has occurred in the network communication, the home appliance 200 transmits an operation signal corresponding to the voice command to at least one sub-home appliance using a mutually agreed communication protocol, that is, a sound protocol, other than the pre-set network communication.

In step S950, the home appliance 200 may receive, from the sub-home appliance through the sound protocol, the operation state and/or the operation result of the sub-home appliance operated by the operation signal.

In an alternative embodiment, the home appliance 200 may set one or more relay home appliances that relay the communication between the home appliance 200 and the sub-home appliances using a sound protocol. When the distance between the home appliance 200 and the sub-home appliance that is a target of communication exceeds the communication range, the home appliance 200 may set one or more of the plurality of home appliances, excluding itself and the sub-home appliance that is the target, as the relay home appliance The embodiments of the present disclosure described above can be embodied in the form of a computer program that can be executed on a computer by various components, and the computer program may be implemented by a non-transitory computer-readable medium. Examples of the non-transitory computer-readable medium may include magnetic media such as a hard disk, a floppy disk and a magnetic tape, optical recording media such as a CD-ROM and a DVD, magneto-optical media such as a floppy disk, and hardware devices specifically configured to store and execute program instructions, such as a ROM, a RAM, a flash memory and the like.

The computer program may be specifically designed and configured for the present disclosure, or may be well known to and usable by those of ordinary skill in the field of computer software. Examples of the computer program may include machine language code such as those produced by a compiler, as well as high-level codes executable by a computer by using an interpreter.

The use of the term "the" and similar terms used in the specification (particularly in the claims) of the present disclosure may refer to both singular and plural. In addition, when a "range" is described in the embodiments of present disclosure, the embodiments of present disclosure may be regarded as including an individual value belonging to the range (unless this results in contradiction). Therefore, even if a description corresponding to the "range" is not given, the individual value belonging to the range may be regarded as being included in the description of the embodiments of present disclosure.

Unless the order of the steps of the methods according to the embodiments of present disclosure is clearly indicated otherwise, the steps may be carried out in any appropriate order. The present disclosure is not limited to the order of the steps described above. All examples or exemplary terms ("for example", "and the like") in the present disclosure are for simply describing the present disclosure in detail. As long as the examples or exemplary terms are limited in the following claims, they do not limit the scope of the embodiments of present disclosure. In addition, it will also be understood by those skilled in the art that various modifications, combinations, and alterations may be made according to design conditions and factors within the scope of the appended claims or equivalents thereof.

While one or more exemplary embodiments of the present disclosure have been described with reference to the figures, it will be understood by those of ordinary skill in the art that various changes in form and details may be made therein without departing from the spirit and scope of the inventive concept as defined by the following claims.

What is claimed is:

1. An apparatus for controlling operations of a plurality of home appliances, comprising:
    a setting unit setting one home appliance among the plurality of home appliances as a main home appliance, and setting at least one of a plurality of remaining home appliances as a sub-home appliance when a voice command is received from an utterer; and
    a communication control unit controlling the main home appliance and the sub-home appliance to communicate with each other using a mutually agreed communication protocol other than a pre-set network communication when a predetermined condition is satisfied.

2. The apparatus according to claim 1, wherein the communication control unit controls the main home appliance and the sub-home appliance to perform communication using the mutually agreed communication protocol when a failure occurs in the pre-set network communication.

3. The apparatus according to claim 1, wherein the one home appliance set as the main home appliance includes a voice recognition function.

4. The apparatus according to claim 1, wherein the setting unit sets, among the plurality of home appliances, one or more relay home appliances that relay communication between the main home appliance and the sub-home appliance using the mutually agreed communication protocol.

5. A method for controlling operation of a plurality of home appliances, comprising:
    setting one home appliance among the plurality of home appliances as a main home appliance, and setting at least one of a plurality of remaining home appliances as a sub-home appliance by means of a setting unit when a voice command is received from an utterer; and
    controlling the main home appliance and the sub-home appliance to communicate with each other using a mutually agreed communication protocol other than a pre-set network communication by means of a communication control unit when a predetermined condition is satisfied.

6. The method according to claim 5, wherein the controlling comprises controlling the main home appliance and the sub-home appliance to perform communication using the mutually agreed communication protocol when a failure occurs in the pre-set network communication.

7. The method according to claim 5, wherein the one home appliance set as the main home appliance includes a voice recognition function.

8. The method according to claim 5, wherein the setting further comprises setting, among the plurality of home appliances, one or more relay home appliances that relay communication between the main home appliance and the sub-home appliance using the mutually agreed communication protocol.

9. A computer program stored in a non-transitory computer-readable medium for executing the method of claim 5 using a computer.

* * * * *